(12) United States Patent
Nakata et al.

(10) Patent No.: US 6,320,689 B1
(45) Date of Patent: Nov. 20, 2001

(54) SEMICONDUCTOR LASER AND OPTICAL SYSTEM HAVING A COLLIMATOR LENS

(75) Inventors: Naotaro Nakata; Akihisa Yoshida, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/369,513

(22) Filed: Aug. 6, 1999

(30) Foreign Application Priority Data

Aug. 17, 1998 (JP) .................................................. 10-230812

(51) Int. Cl.[7] ...................................................... G02B 26/08

(52) U.S. Cl. ............................ 359/196; 359/212; 359/216

(58) Field of Search ..................................... 359/196–227, 359/368, 738–740; 347/263, 256–260

(56) References Cited

U.S. PATENT DOCUMENTS 5,035,476 * 7/1991 Ellis et al. ............................ 359/368

* cited by examiner

*Primary Examiner*—James Phan
(74) *Attorney, Agent, or Firm*—Hoffman & Baron, LLP

(57) ABSTRACT

An optical system includes a semiconductor laser. The semiconductor laser is accommodated within a case. The case is formed with a window to pass through laser light emitted from the semiconductor laser. The laser light passed through the window comes to a collimator lens. Between semiconductor laser and the collimator lens is provided a light shield member having a pinhole to pass through the laser light having passed the window. Laser light made in a parallel luminous flux is outputted from the collimator lens. This laser light is deflected toward a main scanning direction by a deflector and further collected on a scanning surface by a light collector.

3 Claims, 7 Drawing Sheets

ABSENCE OF LIGHT SHIELD

SPOT SIZE AT PINHOLE
b = 0.11 mm

WINDOW APERTURE
c = 1.6 mm

| PINHOLE SIZE<br>a = 1.0 mm | PINHOLE SIZE<br>a = 0.4 mm | PINHOLE SIZE<br>a = 0.3 mm |
|---|---|---|
|  |  |  |

F I G. 6
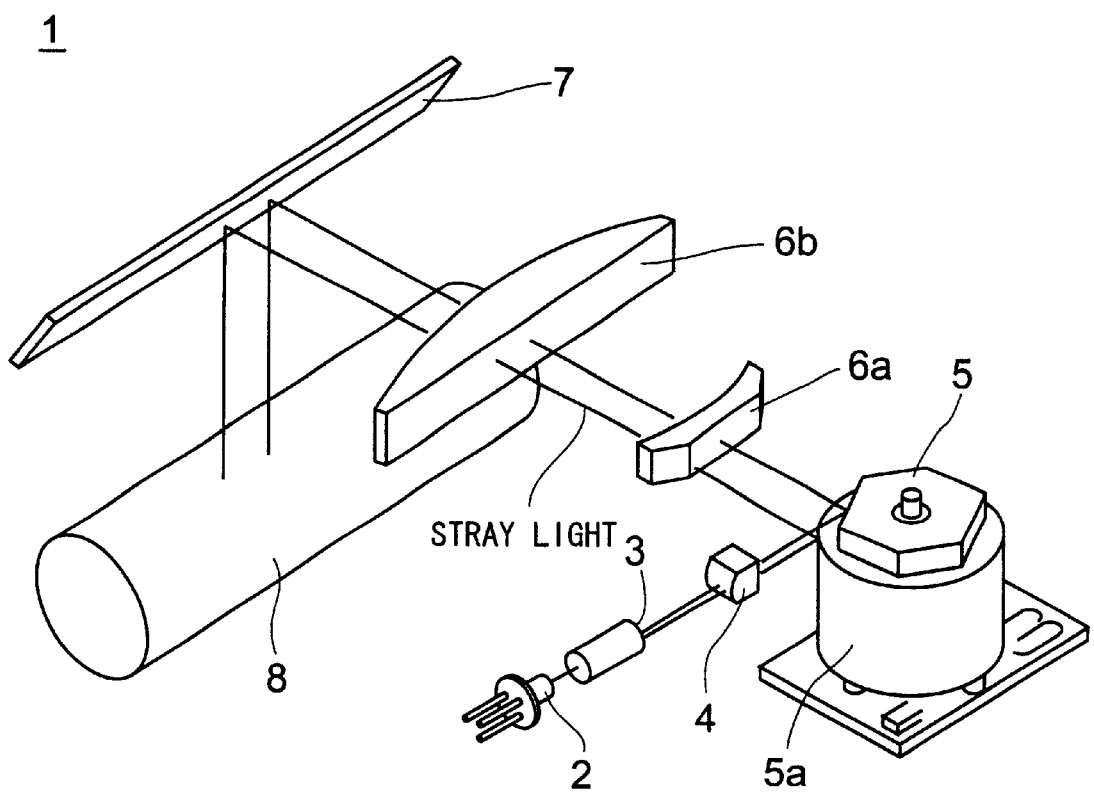

US 6,320,689 B1

SEMICONDUCTOR LASER AND OPTICAL SYSTEM HAVING A COLLIMATOR LENS

BACKGROUND OF THE INVENTION

1. Field of the Invention

This invention relates to optical systems and, more particularly, to an optical system used for laser beam printers, digital PPC and the like which has a semiconductor laser accommodated within a case to emit laser light to be delivered to a collimator lens through a window formed in the case.

2. Description of the Prior Art

There is shown, in FIG. 6, a laser beam printer 1 having a conventional optical system of this kind. In this laser beam printer 1, a semiconductor laser unit 2 emits laser light to be irradiated to a photosensitive drum 8 through a collimator lens 3, a cylinder lens 4, a polygon mirror 5, f-θ lenses 6a and 6b, a reflection mirror 7 and so on. Due to this, an electrostatic latent image is formed on the photosensitive drum 8, which is then toner-developed so that a toner image formed is transferred onto a recording paper.

The semiconductor laser unit 2 used in this laser beam printer 1 includes, as shown in FIG. 7, a case 2b having a window 2a. Within the case 2b, a heat-sink 2c is provided. The heat-sink 2c has a semiconductor laser 2e mounted on a lateral surface thereof through a sub-mount 2d. A cover formed of a transparent material, such as glass, is fitted on an inner side of the window 2a. Meanwhile, the collimator lens 3 is arranged at one end of a lens barrel 3a, while the lens barrel 3a at the other end is faced to the window 2a of the semiconductor laser unit 2. Consequently, the laser light emitted from the semiconductor laser 2e is given onto the collimator lens 3 through the window 2a and lens barrel 3a, and further to a polygon mirror 5 via the cylindrical lens 4.

In the prior art, the laser light emitted from the semiconductor laser 2e is delivered to the collimator lens 3 through the window 2a and lens barrel 3a. Accordingly, part of the laser light reflects upon the window 2a or the lens barrel 3a and thus turns into stray light. Such stray light might travel off the normal path and go onto the photosensitive drum 8. For example, if part of laser light deviates from the polygon mirror 5 and comes to and reflected upon a drive motor 5a or the like, there is a fear that the laser light acts as a rest beam on the photosensitive drum 8 thus resulting in undesired printing (vertical straight line).

SUMMARY OF THE INVENTION

Therefore, it is a primary object of the present invention to provide an optical system which can prevent undesirable printing due to stray light thereby improving image quality.

The present invention is an optical system, comprising: a semiconductor laser;

a case accommodating the semiconductor laser and having a window to pass through laser light emitted from the semiconductor laser; a collimator lens for turning the laser light passed through the window into a parallel luminous flux; a reflector for reflecting the laser light in a parallel luminous flux toward a main scanning direction; a light collector for collecting the laser light reflected on a scanning surface; and a light shield member provided between the semiconductor laser and the collimator lens and having a pinhole to allow the laser light passed through the window to pass through.

The laser light spread with a predetermined angle or greater with respect to an axis of the semiconductor laser or that reflected upon an inner surface of the window formed in the case, in most part, does not pass through the pin hole formed through the light shield member. Also, the laser light reflected upon the window inner surface or pinhole inner surface, in greater part, attenuates due to the reflection. Accordingly, there is no occurrence of stray light that might cause undesired printing.

According to the present invention, image quality is improved because undesired printing is prevented.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view showing a prior art; and

DETAILED DESCRIPTION OF THE PREFERRED EMBODIMENTS

Figure 1:
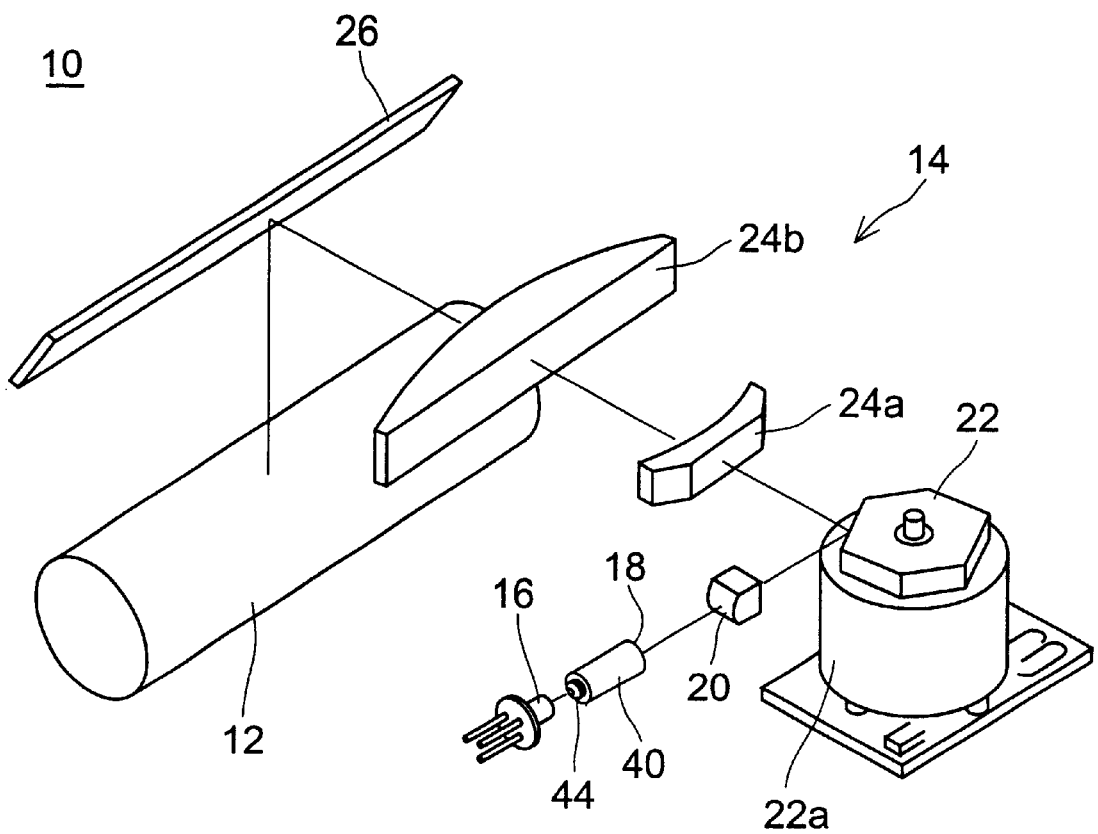
FIG. 1 is illustrative view showing one embodiment of the present invention.

There is illustrated, in FIG. 1, a laser beam printer 10 as an optical system according to this embodiment. The laser beam printer 10 includes a scanning section 14 to scan over a surface of a photosensitive drum 12, a developing unit to toner-develop an electrostatic latent image formed on the surface of the photosensitive drum 12, and a transfer unit to transfer a toner image onto a recording paper. It should be noted that the developing and transfer units are applicable by those of well known structures and their illustration and explanation are herein omitted.

The scanning section 14 includes a semiconductor laser unit 16. The semiconductor laser unit 16 emits laser light to be passed through a collimator lens 18, a cylinder lens 20, a polygon mirror 22, f-θ lenses 24a and 24b and a reflection mirror 26 and then collected on the surface of the photosensitive drum 12.

Figure 2:
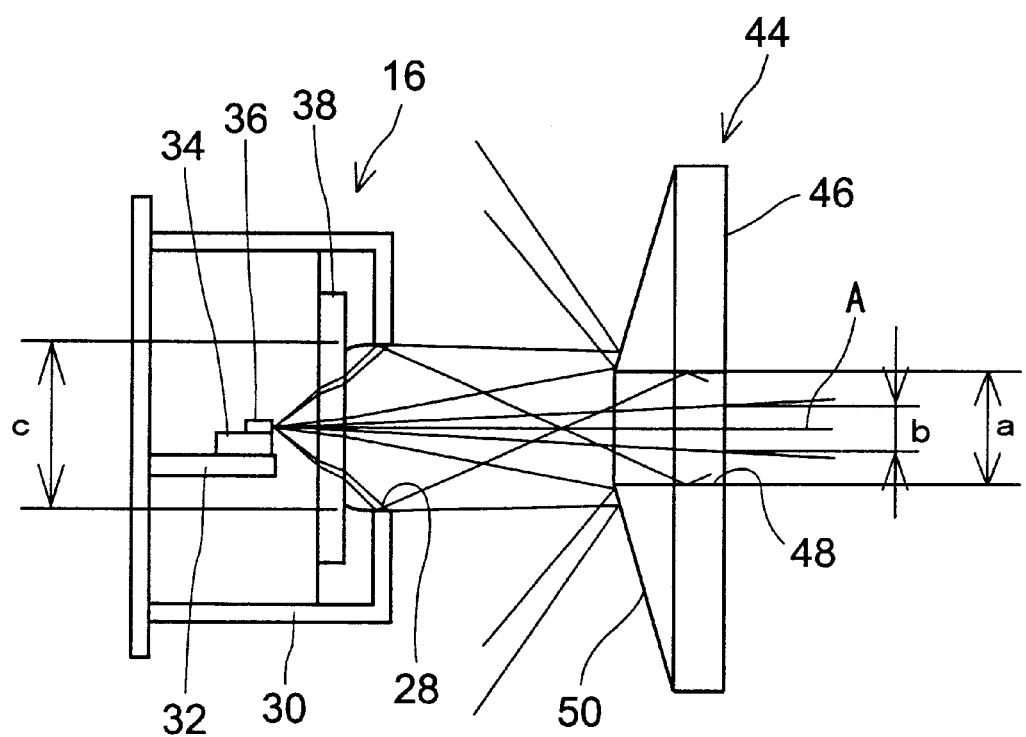
FIG. 2 is illustrative view showing a semiconductor laser unit and a light shield member.

The semiconductor laser unit 16, as shown in FIG. 2, includes a case 30 having a window 28. Within the case 30 a heat-sink 32 is provided. A semiconductor laser 36 is mounted on a lateral surface of the heat-sink 32 through a sub-mount 34. On an inner side of the window 28 is fitted a cover 38 formed of a transparent material, such as a glass.

Figure 3:
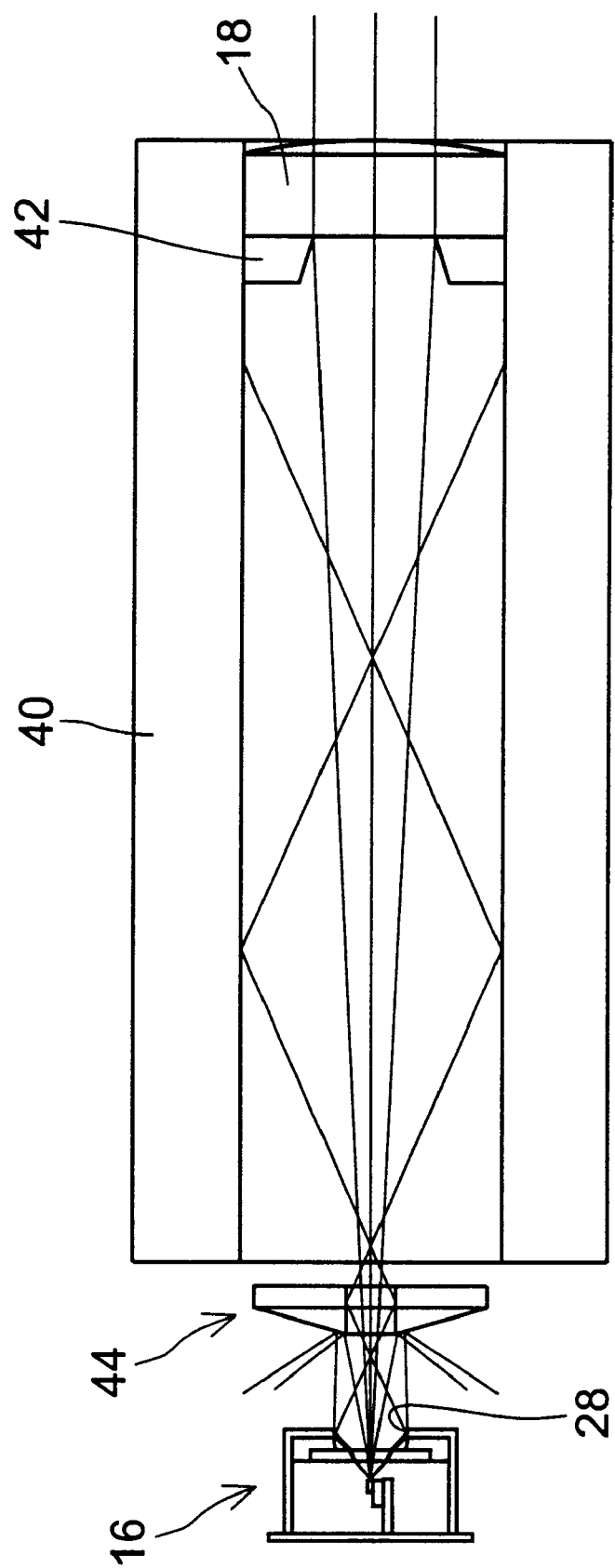
FIG. 3 is an illustrative view showing a path of laser light.
Figure 4:
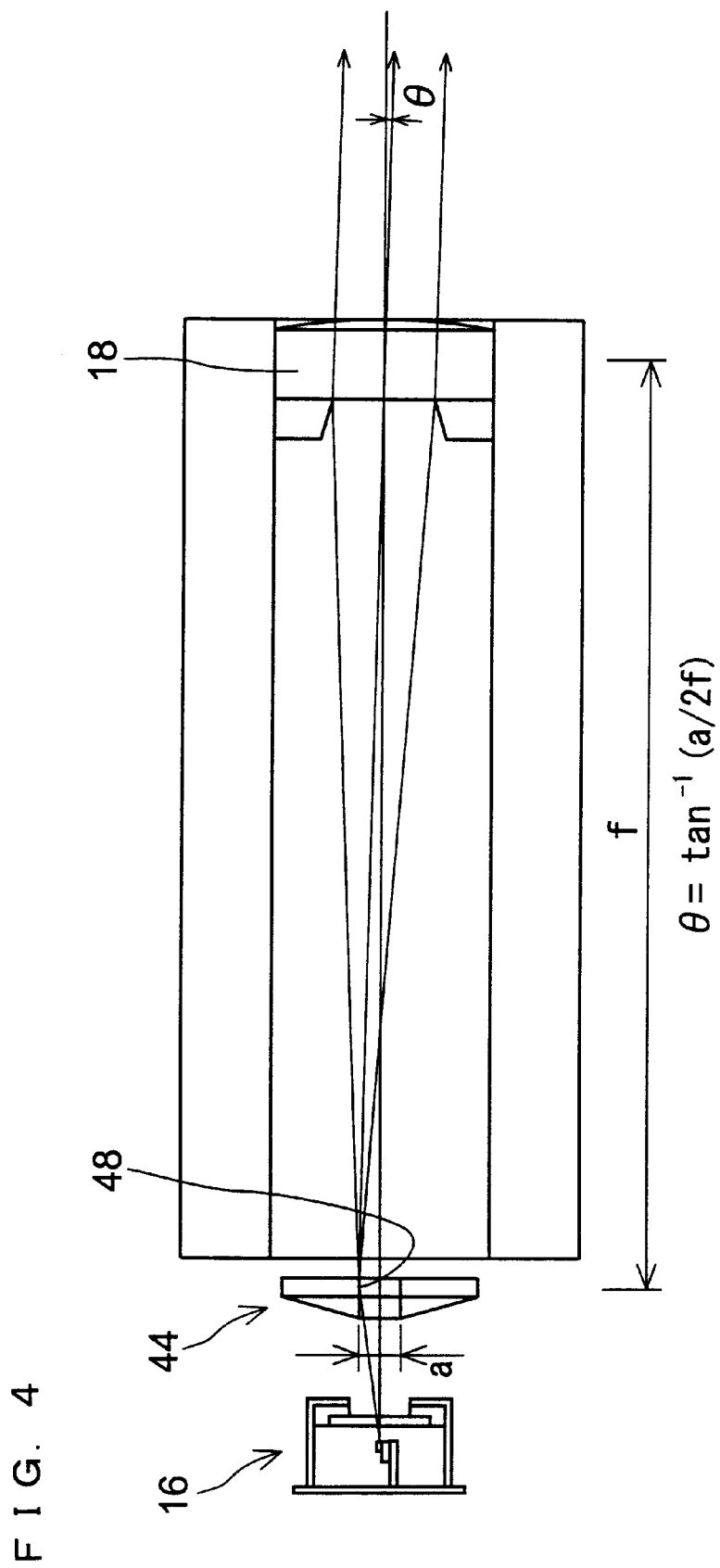
FIG. 4 is an illustrative view showing a path of reflected laser light.

The collimator lens 18 is fixed at one end of the lens barrel 40, as shown in FIG. 3. The collimator lens 18 has a beam aperture 42 arranged on a light incident surface thereof, to define a beam spot form. The lens barrel 40 at the other end is faced to the window 28 of the semiconductor laser unit 16. A light shield member 44 is provided between the lens barrel 40 (collimator lens 18) and the semiconductor laser unit 16, in order to shield off stray light.

The light shield member 44 includes, as shown in FIG. 2, a main body 46 formed in disc form of a plastic or the like. A pinhole 48 is centrally formed through the main body 46.

Also, a conical slant reflection surface 50 is provided on a close side of the main body 46 to the semiconductor laser unit 16. Incidentally, the light shield member 44 is preferably formed of a black material in order to enhance light absorption. Alternatively, a black paint may be applied to the light shield member 44.

With a laser beam printer 10 constructed as above, if a current is supplied to the semiconductor laser 36, laser light elliptical in section is emitted from an end face of the semiconductor laser 36. This laser light is directed through the window 28, pinhole 48 and lens barrel 40 to the collimator lens 18. The collimator lens 18 turns the laser light into a parallel luminous flux. The laser light in a parallel luminous flux is delivered to the polygon mirror 22 through the cylindrical lens 20. The polygon mirror 22 deflects the laser light to a main scanning direction. Further, the deflected laser light is passed through the f-θ lenses 24a and 24b and reflection mirror 26, and then focused on a surface of the photosensitive drum 12. Thus, an electrostatic latent image is formed on the same surface. This electrostatic latent image is then toner-developed by a not-shown developing unit. A toner image formed is transferred onto a recording paper by a transfer unit.

In the case that the laser light emitted from the semiconductor laser 36 is directly delivered to the collimator lens 18, the laser light (hereinafter referred to as "main laser light") accurately comes to and is deflected by a reflection surface of the polygon mirror 22 through the cylinder lens 20. However, the laser light emitted from the semiconductor laser 36 has spread with a predetermined angle with respect to an optical axis A of the semiconductor laser 36. One part of the laser light is reflected upon a reflection surface 50 of the light shield member 44, thus released away from the optical axis A. Meanwhile, another part of the laser light travels toward the collimator lens 18 while being reflected on inner surfaces of the window 28 and pinhole 48.

In the latter case, if the number of times of reflections is twice or more, the laser light is largely weakened by an attenuation effect caused due to reflection, almost free from a problem with stray light. On the contrary, if the laser light is reflected only once upon an inner surface of the pinhole 48, the laser light (hereinafter referred to as "reflected laser light") is not fully attenuated but travels in a deviation angle of θ with respect to the main beam [θ=tan$^{-1}$(a/2f), a: aperture of the pinhole 48, f: focal distance of the collimator lens 18]. Accordingly, there is a fear that the laser light is reflected upon a drive motor 22a of the polygon mirror 22 or the like and then collected in a rest beam formed on a surface of the photosensitive drum 12, similar to the conventional case.

In the present embodiment, setting is made on a distance between the collimator lens 18 and the polygon mirror 22, a size of a reflection surface of the polygon mirror 22, etc. such that the reflected laser light all comes onto the reflection surface of the polygon mirror 22. With such setting, the reflected laser light is all deflected toward a main scanning direction. It is therefore possible to prevent the reflected laser light from gathering onto one point of a surface of the photosensitive drum 12. This, coupled with somewhat attenuation due to once reflection, prevents against undesired printing.

Meanwhile, if the aperture of the pinhole 48 in the light shield member 44 is increased to an excessive extent, the effect of blocking off stray light is not fully exhibited. On the other hand, if the aperture of the pinhole 48 is made excessively small, also the main laser light is shielded, resulting in difficulty to obtain sufficient resolution. Therefore, in the present embodiment the aperture a of the pinhole 48 is set at least 2 times greater than a spot diameter b of the main laser beam in a pinhole 48 position (FIG. 2) but smaller than aperture c of the window 28 (2b≦a≦c), in order to positively block off stray light without incurring a reduction in resolution. This condition has been empirically determined by the present inventors.

Figure 5:
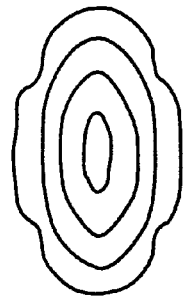
FIG. 5 is an illustrative view showing a relationship between a pinhole aperture and a spot shape.
Figure 5:
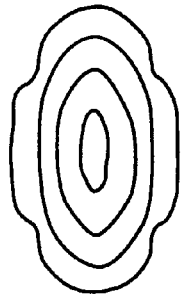
Figure 5:
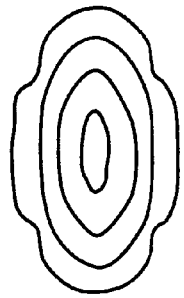
Figure 5:
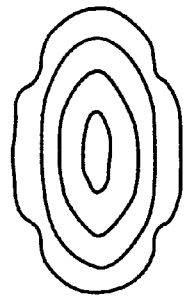
Figure 7:
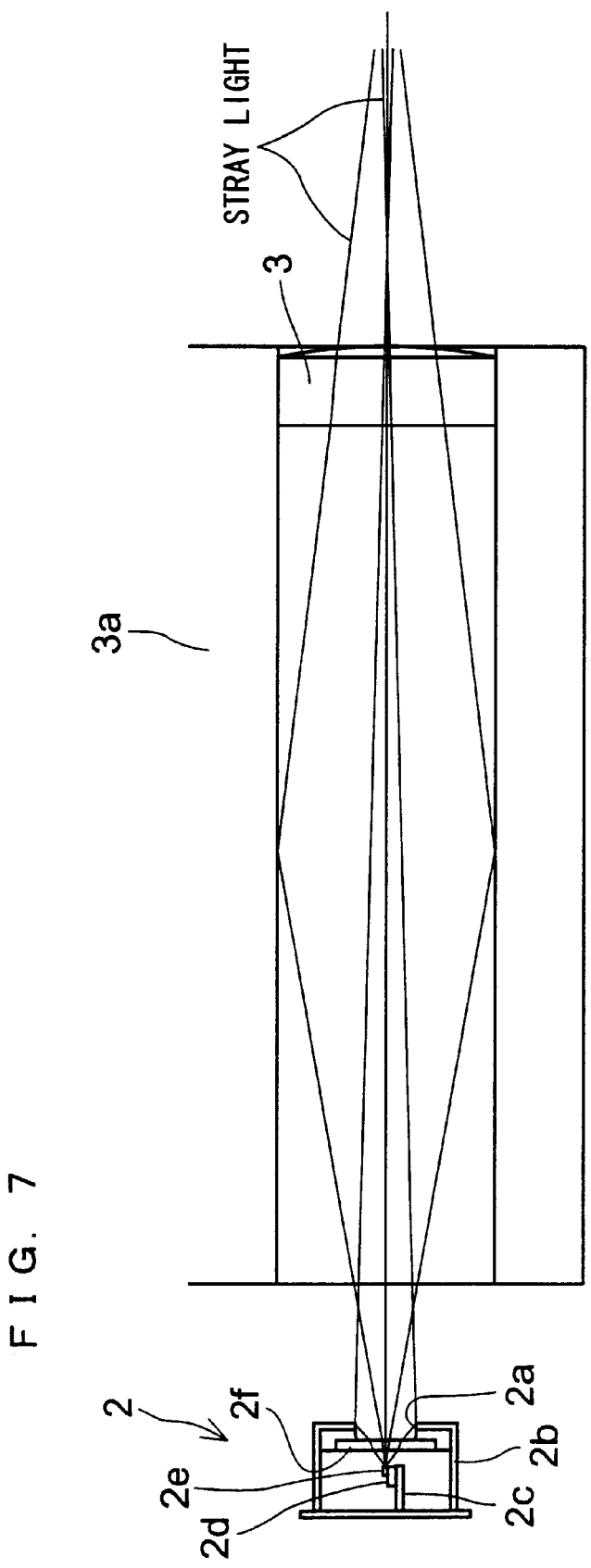
FIG. 7 is an illustrative view showing a path of laser light in the prior art.

Incidentally, FIG. 5 shows a relationship between an aperture of the pinhole 48 and a spot formed on a virtual plane wherein a spot diameter b is taken 0.1 mm, an aperture c of a window 28 is 1.6 mm and a virtual plane is positioned frontward of the collimator lens 18. It can be understood from FIG. 5 that a satisfactory resolution can be obtained where the condition of 2b≦a is fulfilled.

According to the present embodiment, image quality can be improved because undesirable printing due to stray light is prevented.

Incidentally, although the above embodiment showed the case that the present invention is applied to a laser beam printer, the present invention is similarly applicable to another optical system, such as digital PPC.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical system, comprising:
   a semiconductor laser;
   a case accommodating said semiconductor laser and having a window to pass through laser light emitted from said semiconductor laser;
   a collimator lens for turning said laser light passed through said window into a parallel luminous flux;
   a deflector for reflecting said laser light in a parallel luminous flux toward a main scanning direction;
   a light collector for collecting the laser light onto a scanning surface; and
   a light shield member provided between said semiconductor laser and said collimator lens and having a pinhole to allow said laser light passed through said window to pass through, wherein said laser light reflected upon an inner surface of said pinhole and then directly delivered to said collimator lens is all given to said deflector.

2. An optical system according to claim 1, further comprising a reflection surface provided on said light shield member at around said pinhole to reflect said laser light in a direction away from an optical axis thereof.

3. An optical system according to claim 1, wherein said pinhole has an aperture having a diameter at least two times greater than a spot diameter of said laser light in said pinhole position that is to be delivered from said semiconductor laser directly to said collimator lens.

* * * * *